Dec. 30, 1941.　　　A. F. STRAUS　　　2,268,064
TOWING HITCH
Filed March 16, 1939
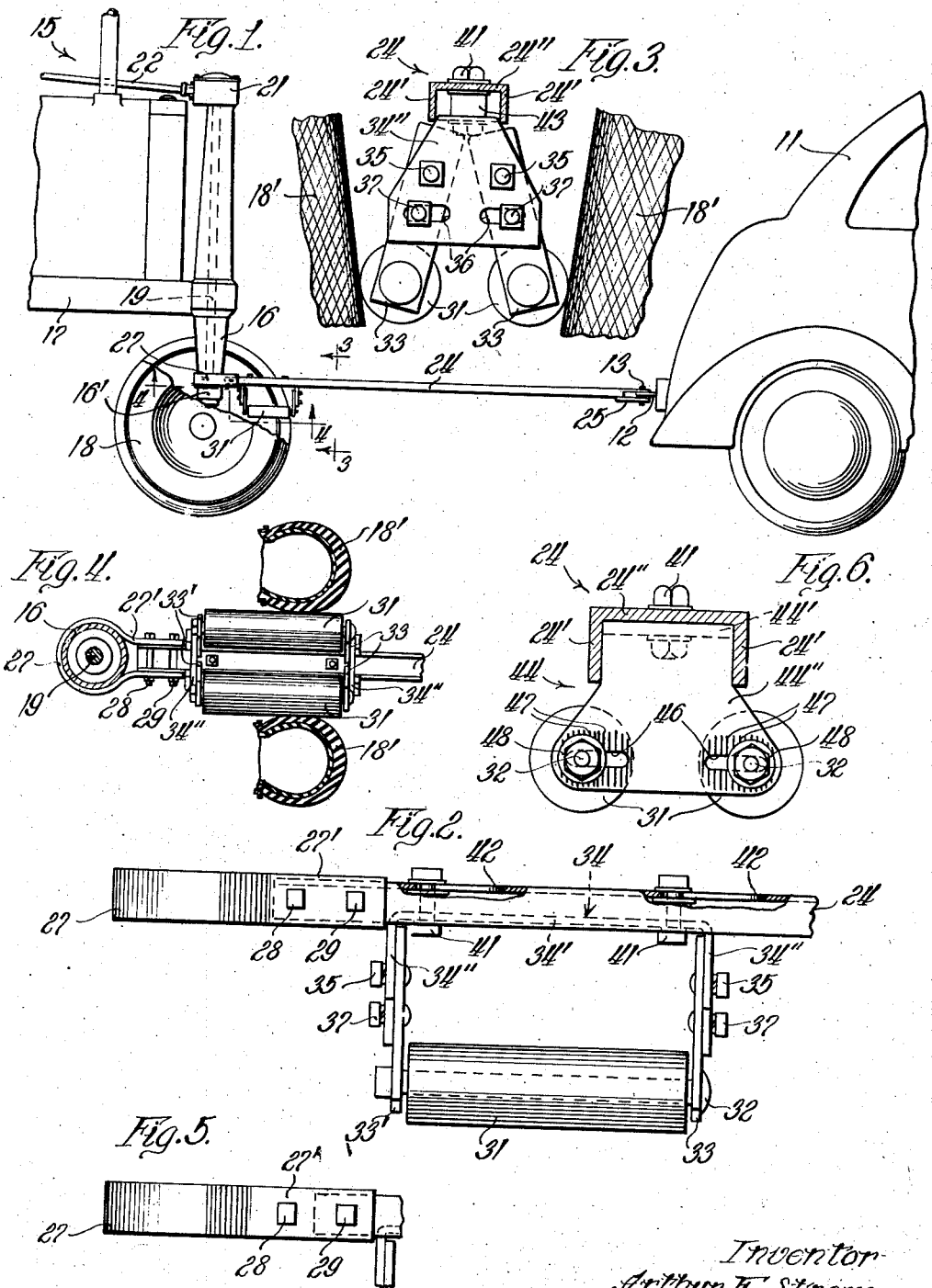
Inventor
Arthur F. Straus
By Brown, Jackson, Boettcher & Dienner
Attys.

UNITED STATES PATENT OFFICE 2,268,064

TOWING HITCH

Arthur F. Straus, West Bend, Wis.

Application March 16, 1939, Serial No. 262,083

11 Claims. (Cl. 280—33.5)

The present invention relates to an automatic steering draft hitch which I have devised primarily for the towing of farm tractors, although, as will hereinafter appear, my improved hitch is also applicable to the towing of other vehicles as well.

Innumerable instances arise where it is desired to be able to tow a farm tractor behind a passenger automobile or a truck, by the employment of a hitch connection which will automatically steer the tractor so that it is not necessary for a man to ride the tractor while it is being towed. For example, implement dealers frequently wish to tow a tractor out to a farm for a demonstration, and the ability to tow the tractor at a considerable speed behind a passenger car, substantially as one would tow a trailer, is of great advantage for making long jumps and for covering a large amount of territory quickly. Also, in the case of farms of considerable size, a farmer frequently desires to tow the tractor to a distant field behind an automobile, so that he will have the automobile available for making return trips to the farm at mealtime and at the end of the day. Furthermore, in each of the above instances, and also for delivering tractors from the factory to the dealer, it may sometimes be desirable to tow a train of two or more tractors behind an automobile or other pulling vehicle.

The modern farm tractor can be towed at a much higher speed than could the old style tractors, particularly those of great weight. This is especially true of modern farm tractors equipped with rubber tires on all wheels, which can be towed at a surprisingly high speed without objectionable vibration or loss of control.

In its preferred embodiment, my improved steering draft hitch has been developed primarily for these more modern types of farm tractors, and particularly for the very prevalent type in which the two front steering wheels are grouped closely together on opposite sides of a single centrally disposed steering column which extends downwardly as a hollow support or pedestal at the front end of the tractor, these two steering wheels swinging laterally about the vertical axis of a steering spindle which is rotatably supported in said steering column. This preferred embodiment of towing hitch for use with the latter type of tractor comprises a draft beam which has its front end attached by any suitable hitch connection with the towing vehicle and which has its rear end extending back directly between the two closely spaced front steering wheels of the tractor for effecting draft connection with said centrally disposed steering column. This latter draft connection is preferably established by a circular clevis or loop which encircles the steering column and which is capable of being deflected or turned laterally thereon for steering purposes while under draft load. Mounted at the sides of the draft beam, forwardly of this clevis, are two longitudinally extending rollers which are positioned so as to be able to engage the adjacent sides of the tractor steering wheels substantially at the front portions or edges of said wheels. These rollers are adapted to impart a forced steering deflection to the tractor steering wheels whenever the draft beam is deflected laterally in a steering movement made by the towing vehicle. By thus applying the steering force directly to the sides of the wheels themselves, an extremely large steering force can be exerted on the wheels, which insures reliable steering control of the tractor, and insures adequate force to overcome the resistance of any so-called irreversible gear mechanism which may be embodied in the steering apparatus of the tractor.

My improved towing hitch can also be employed for coupling two or more tractors in a train to be drawn behind a pulling vehicle, as previously remarked. The entire hitch is of relatively simple construction, and can be readily coupled between any desired towing vehicle and the tractor. In some instances, the draft clevis may remain permanently assembled around the vertical steering column of the tractor so that it is only necessary to couple the draft beam to the clevis. The pair of parallel rollers which impart the steering deflection to the tractor steering wheels can be adjusted laterally and also fore and aft along the draft beam to adapt the hitch to different makes and models of tractors. While the hitch has its primary field of utility as a towing device for tractors, it will be understood that it can also be used to tow any other type of vehicle having an equivalent arrangement of front steering wheels or wheel.

Other advantages and objects of the invention will appear from the following detailed description of different preferred embodiments of the invention. In the accompanying drawing illustrating these embodiments:

Figure 1 is a fragmentary side elevational view illustrating my improved towing hitch coupled between a passenger automobile and a tractor of the above described class, the near steering wheel of said tractor being partly broken away to illustrate the hitch to better advantage;

Figure 2 is a fragmentary side elevational view of the rear portion of the hitch on a larger scale;

Figure 3 is a transverse sectional view, taken approximately on the line 3—3 of Figure 1;

Figure 4 is an inverted fragmentary view looking upwardly at the underside of the hitch, corresponding to a view taken approximately on the plane of the line 4—4 of Figure 1;

Figure 5 is a fragmentary side elevational view illustrating a different arrangement of the invention, and Figure 6 is a transverse sectional view, similar to Fig. 3, illustrating a different embodiment of the invention.

The towing vehicle, represented by the passenger automobile 11, is made adaptable to towing use by securing any suitable drawbar or like type of coupling member 12 to the rear of the vehicle, this drawbar having a vertical opening therein for receiving the draft pin 13 which connects the drawbar with the draft beam of the hitch. In some instances, the drawbar 12 is secured directly to the center of the rear bumper of the automobile, this bumper being then reinforced so as to sustain the draft stresses.

The tractor 15 is shown as being of the previously described type, in which a hollow vertical steering column or pedestal 16 is secured to the front end of the tractor frame 17, centrally of said front end. The two tractor steering wheels 18 are spaced closely together on opposite sides of this steering column 16. These wheels are shown as being equipped with rubber tires 18', my improved hitch operating to better advantage in the case of tractors so equipped, although it will be understood that the utility of the hitch is not essentially limited to tractors having rubber tires. A steering spindle 19 extends down through the steering column 16, and carries at its lower end the two outwardly extending axles on which the wheels 18 are journaled. Steering motion is imparted to this spindle through appropriate gearing contained within an upper gear housing 21, this gearing connecting with a shaft 22 which extends rearwardly to the operator's steering wheel. The upward and outward inclination of the two steering wheels 18 illustrates a typical degree of camber usually given to these wheels. In the usual construction, these wheels also have a slight degree of castering action. However, the utility of my improved towing hitch is not limited to tractors in which the steering wheels have this camber and caster.

My improved hitch comprises a draft beam 24 preferably in the form of a length of channel iron disposed with the side flanges 24' extending downwardly from the web portion 24". At the front end of the draft beam a plate 25 is welded to the underside of the beam, and aligned holes are drilled in this plate and in the extending web portion of the beam for receiving the draft pin 13. The side flanges of the beam are cut away to permit complete range of lateral swinging movement of the beam relatively to the drawbar 12 of the towing vehicle, and sufficient vertical play is also provided so that the draft beam can tilt upwardly and downwardly through a considerable angle for accommodating relative rise and fall between the two vehicles.

The draft bar 24 extends rearwardly between the two front steering wheels 18 of the tractor and carries a circular draft clevis 27 which encircles the steering column 16. Said clevis comprises substantially parallel end portions 27' which embrace the sides of the draft beam and which are apertured to receive bolts 28 and 29 that pass through aligned holes in the side flanges 24' of the draft beam. The lower end of the hollow steering column 16 usually expands outwardly in the form of a flange, bead, or other circular enlargement 16', and the clevis 27 rests against the upper end of this enlargement. In the case of any make or model of tractor not having this circular enlargement, a split clamping band may be fastened about the tubular housing 16 to form such a shoulder; or the clevis 27 may rest directly upon the steering wheel axles, or even upon the hubs of these steering wheels. The clevis engages around the tubular column 16 with sufficient looseness so that it can swivel freely around the column in a steering operation, and can also tilt sufficiently in a fore and aft plane to accommodate relative rise and fall between the two vehicles in passing over uneven ground. At the same time, the clevis engages with sufficient snugness so that braking forces exerted on the towing vehicle 11 are effective immediately in the tractor through the hitch connection. From its lower end, the column or housing 16 usually tapers upwardly and outwardly to the level of the tractor frame 17, and this taper is sufficient to prevent accidental displacement of the draft clevis 27 upwardly along the column; or, a split clamping ring can be clamped around the column slightly above the clevis.

The two steering rollers 31, 31 are supported from the underside of the draft beam 24 and extend substantially parallel with the sides thereof. These two rollers, which are adapted to bear against the sides of the tires 18' at the forward portions of the wheels 18, are of duplicate construction, each consisting of a metallic roll or cylinder rotatably mounted on a through bolt 32 which serves as an axle. In the construction illustrated in Figures 2, 3 and 4, the ends of the axle bolts 32 are supported in duplicate pairs of front and rear supporting arms 33, 33'. Said arms are carried by an inverted U-shaped bracket 34 comprising the longitudinally extending upper portion 34' and the downwardly extending front and rear end portions 34". The longitudinally extending portion 34' is made sufficiently narrow to fit up between the side flanges 24' of the draft beam, and the end portions 34" of this bracket or carrier extend out to a substantially greater width, as illustrated in Figure 3. The arms, 33, 33' are pivotally connected to these bracket end portions by the pivot bolts 35. Below the pivot bolts 35 the bracket end portions 34" are formed with approximately horizontal slots 36 for receiving clamping bolts 37 which extend through the arms 33, 33'. This adjustable mounting of the arms 33, 33' enables the steering rollers 31, 31 to be adjusted inwardly or outwardly for adjusting the hitch to different makes or models or tractors in which the spacing between the wheels 18 may be different. The rolls 31 may be given any desired adjustment, ranging from a position normally spaced out of contact with the tires 18' to a position normally pressing firmly against the tires, the rolls being held in any desired one of these adjustments by the tightening of the clamping bolts 37, 37.

The above described assembly comprising the bracket 34 and the rolls 31 is mounted on the draft beam 24 in such manner as to be capable of adjustment longitudinally thereof. As best shown in Fig. 2, the bracket is secured to the draft beam by bolts 41 which pass up through the longitudinal portion 34' of the bracket and engage in relatively long slots 42 cut in the web portion 24" of the draft beam. These slots permit the bracket and steering rolls to be adjusted fore and aft, whereby the side walls of the tires of different size wheels can be made to properly engage the steering rolls 31 at points intermediate their ends. As shown in Figure 3, spacing thimbles 43 are mounted on the shanks of the clamping bolts 41 between the bracket 34 and the slotted web portion of the channel. If it should be desired to adjust the height of the steering rollers 31 relative to the draft beam 24, such could be accomplished by using different lengths of spacing thimbles or sleeves 43.

When the tractor is to be towed through the hitch connection rather frequently it may be desirable to leave the draft clevis 27 in its assembled relation around the steering column 16, and to merely connect and disconnect the draft beam from the clevis. This may be accomplished each time by removing the bolts 28 and 29, and then replacing one or both of these bolts to retain the clevis in place during the normal use of the tractor. Figure 5 illustrates a modified arrangement or construction in which the rear bolt 28 remains more or less permanently in place for retaining the clevis 27 assembled around the steering column. Here the draft beam is connected with the clevis solely through the front bolt 29, and hence it is only necessary to remove this one bolt in connecting or disconnecting the draft beam. The single bolt connection also permits a wide range of vertical articulation between the draft beam and clevis.

In Figure 6 I have illustrated a modified construction of bracket or carrier for the steering rolls 31. This bracket 44 is a casting of inverted U-shape comprising an upper longitudinally extending portion 44' and the downwardly extending end portions 44", much like the bracket 34. However, in this modified construction, the front and rear end portions 44" have substantially horizontal slots 46 formed therein in which the axle bolts 32 of the rollers are directly mounted. For the purpose of locking these axle bolts in any adjusted relation in these slots, the end faces of the depending portions 44" are formed with vertical V-shaped corrugations or ribs 47 in the immediate locality of the slots 46. Washers 48 are disposed under the heads and nuts of these axle bolts, and the inner surfaces of these washers have similar V-shaped corrugations adapted to match and interlock with the corrugations 47. Thus, the axle bolts will be securely locked in any transversely adjusted positions in the slots 46. This bracket 44 is secured to the draft beam by the bolts 41 which are disposed in the lengthwise slots 42 formed in the web portion of the channel, whereby said bracket can be adjusted fore and aft in the manner described of the preceding embodiment. Also, if desired, spacing washers or sleeves might be mounted on the shanks of the bolts 41 between the channel portion 24" and the bracket portion 44' to effect vertical adjustments of the steering rollers relatively to the draft beam. Should it be desired to adjust the axes of the steering rollers into a converging or diverging relation at their front ends, as for accommodating a toed-in relation of the steering wheels or for adjusting the points of contact with the side walls of the tires, such can be readily accomplished in the embodiment shown in Figures 2, 3 and 4 and in the embodiment shown in Figure 6, by simply adjusting the spacing between the front ends of the axle bolts to a greater or lesser degree than at the rear ends.

In the operation of my improved towing hitch, a positive coupling is maintained between the towing vehicle and the tractor at all times, so that the accelerating and braking forces of the towing vehicle are immediately effective at the tractor. In steering operations, the application of the steering force to the side walls of the tires at the farthest front portions of the wheels results in the steering force being applied at the most effective radius. It should also be noted that the steering rollers 31 swing around the same axis (the axis of the steering spindle 19) as do the wheels 18 in all steering operations, and hence there is no chafing or destructive wear of the tires against these steering rollers. The forward travel and the steering guidance is maintained under sufficiently accurate control so that the tractor can be safely towed, driverless, at a relatively high speed and over uneven roads. The steering force exerted by the steering rollers 31 is adequate to overcome the resistance of any conventional gearing ordinarily found in the gear housing 21, but if this resistance should be exceptionally high in some instances the gearing can be disconnected during the towing operation. A train of two or more tractors can also be towed satisfactorily by the use of my improved towing hitches. It will be understood that my improved hitch can also be employed for towing other vehicles having similarly arranged or related steering wheels.

While I have illustrated what I regard to be the preferred embodiments of my invention, nevertheless it will be understood that such are merely exemplary and that numerous modifications and rearrangements may be made therein without departing from the essence of the invention.

I claim:

1. In hitch apparatus for towing a tractor of the type having at its front end a centrally disposed steering column with two rubber-tired steering wheels mounted for steering movement about the axis of a spindle in said column, the combination of a draft beam of channel section having downwardly extending side flanges, means at the front end of said draft beam for establishing a laterally swinging pivotal connection with a towing vehicle, a draft clevis at the rear end of said beam adapted to encircle the steering column of said tractor and capable of lateral swinging movement about said column, an inverted U-shaped bracket having a longitudinally extending intermediate portion and downwardly extending end portions, said intermediate portion engaging between the side flanges of said channel and being adjustable fore and aft therein, arms pivotally mounted on said bracket end portions and arranged for pivotal adjusting movement towards and from each other, rollers carried by said arms adapted to engage the side walls of the rubber tires substantially at the forward portions of said steering wheels for imparting steering movement to the wheels, and clamping bolts effective between said bracket end portions and said pivotally mounted arms for retaining said arms in their different positions of adjustment.

2. In hitch apparatus for towing a tractor of the type having at its front end a centrally disposed steering column with two closely spaced steering wheels on opposite sides of said column, the combination of a draft beam adapted to have its front end coupled with a towing vehicle, a draft clevis at the rear end of said beam adapted to encircle the steering column of said tractor and capable of lateral swinging movement about said column, a bracket carried by said draft beam comprising spaced end portions, slots in said end portions, axle members adjustably mounted in said slots, and rollers carried by said axle members adapted to engage the inner side surfaces of said tractor steering wheels for imparting steering movement thereto.

3. In hitch apparatus for towing a tractor of the type having at its front end a centrally disposed steering column with two rubber-tired steering wheels mounted for steering movement about the axis of a steering spindle in said column, the combination of a draft beam arranged to have its front end connected with a towing vehicle and capable of lateral swinging movement relatively thereto, a draft connection at the rear end of said beam adapted to encircle the steering column of said tractor and capable of lateral swinging movement about said column, a bracket carried by said draft beam comprising spaced end portions projecting angularly from the beam, slots in said end portions, axle members adjustably mounted in said slots, rollers carried by said axle members and adapted to engage the side walls of the rubber tires substantially at the forward portions of said steering wheels for imparting steering movement to the wheels, clamping ribs formed in said bracket end portions adjacent to said slots, and washers on said axle members have interlocking engagement with the clamping having cooperating clamping ribs adapted to ribs on said bracket end portions.

4. In a dirigible hitch connection for towing a vehicle of the type in which the front steering wheels are in closely spaced relation on opposite sides of a central steering column around which said wheels swing in their steering movement, the combination of a draft beam adapted to have a laterally swinging draft connection at its front end with a towing vehicle and to have a laterally swinging draft connection at its rear end with said steering column, said draft beam being capable of lateral swinging movement relatively to the towed vehicle, around a single axis disposed between said wheels, and steering means associated with said draft beam for imparting steering movement to said front steering wheels of the towed vehicle, said steering means being fixed in rigid relation to said draft beam with regard to lateral movement, whereby said draft beam and steering means both swing laterally together as a rigid unit concentrically with respect to the draft connection at the front end of said draft beam and concentrically with respect to said single axis which is disposed between the front steering wheels of the towed vehicle.

5. In hitch apparatus for towing a tractor of the type having at its front end a centrally disposed steering column with two rubber-tired steering wheels mounted for steering movement about the axis of a spindle in said column, the combination of a draft beam of channel section having downwardly extending side flanges, means at the front end of said draft beam for establishing a laterally swinging pivotal connection with a towing vehicle, a draft clevis at the rear end of said beam adapted to encircle the steering column of said tractor and capable of lateral swinging movement about said column, an inverted U-shaped bracket having a longitudinally extending intermediate portion and downwardly extending end portions, said intermediate portion engaging between the side flanges of said channel, clamping bolts effective between said intermediate portion and the web portion of said channel and enabling said bracket to be adjusted fore and aft in said channel, rollers adapted to engage the side walls of the rubber tires substantially at the forward portions of said steering wheels for imparting steering movement to the wheels, and means for mounting said rollers between the downwardly extending end portions of said bracket, said latter means enabling said rollers to be adjusted toward and from each other, the entire steering force transmitted by said hitch apparatus to the tractor being exerted solely through the engagement of said rollers against the side surfaces of said rubber-tired steering wheels.

6. In hitch apparatus for towing a tractor of the type having at its front end a centrally disposed steering column with two closely spaced rubber-tired steering wheels on opposite sides of said column, both of said wheels having steering movement about a single centrally disposed steering axis extending through said column, the combination of a draft beam of channel section having downwardly extending side flanges, means at the front end of said draft beam for establishing a laterally swinging pivotal connection with a towing vehicle, a draft clevis comprising a circular rear portion encircling said steering column and forwardly extending end portions, the rear end of said draft beam being bolted between the forwardly extending end portions of said clevis, said clevis being capable of rotative movement about said column substantially concentrically of said single steering axis, an inverted U-shaped bracket having a longitudinally extending intermediate portion and downwardly extending end portions, clamping bolts effective between said intermediate portion and said draft beam enabling said bracket to be adjusted fore and aft relatively to said draft beam, means cooperating with said clamping bolts enabling said bracket to be adjusted vertically relatively to said draft beam, rollers adapted to engage the side walls of said rubber-tired steering wheels substantially at the forward portions of said wheels for imparting steering movement thereto, and means mounting said rollers on said downwardly extending end portions of said bracket and enabling said rollers to be adjusted toward and from each other, the entire steering force transmitted by said hitch apparatus to the tractor being exerted solely through the engagement of said rollers against the side surfaces of said rubber-tired steering wheels.

7. In hitch apparatus for towing a tractor of the type having at its front end a centrally disposed steering column with two rubber-tired steering wheels mounted for steering movement about the axis of a spindle in said column, the combination of a draft beam of channel section having downwardly extending side flanges, means at the front end of said draft beam for establishing a laterally swinging pivotal connection with a towing vehicle, means at the rear end of said draft beam for establishing a laterally swinging pivotal connection with said centrally disposed steering column of the tractor, an inverted U-shaped bracket having a longitudinally extending intermediate portion and downwardly extending end portions, said intermediate portion engaging between the side flanges of said channel and being adjustable fore and aft therein, rollers adapted to engage the side walls of the rubber tires substantially at the forward portions of said steering wheels for imparting steering movement to the wheels, and means for mounting said rollers on said downwardly extending end portions of said U-shaped bracket, said latter means enabling lateral spacing adjustments to be made between said rollers.

8. In hitch apparatus for towing a tractor of the type having at its front end a centrally disposed steering column with two closely spaced steering wheels on opposite sides of said column, both of said wheels having steering movement about a single centrally disposed steering axis extending through said column, the combination of a draft beam adapted to have its front end coupled with a towing vehicle, means establishing a draft coupling between the rear end of said beam and said centrally disposed steering column, said draft coupling permitting lateral swinging movement of said draft beam, a bracket carried by said draft beam comprising spaced end portions, slots in said end portions, axle members adjustably mounted in said slots, and rollers carried by said axle members adapted to engage the inner side surfaces of said tractor steering wheels for imparting steering movement thereto.

9. In hitch apparatus for towing a tractor of the type having at its front end a centrally disposed steering column with two closely spaced rubber-tired steering wheels on opposite sides of said column, both of said wheels having steering movement about a single centrally disposed steering axis extending through said column, the combination of a draft beam arranged to have its front end connected with a towing vehicle and capable of lateral swinging movement relatively thereto, means establishing a draft coupling between the rear end of said draft beam and said centrally disposed steering column, said draft coupling permitting lateral swinging movement of said draft beam relatively to the tractor, a bracket carried by said draft beam comprising spaced end portions projecting angularly from the beam, slots in said end portions, axle members adjustably mounted in said slots, rollers carried by said axle members and adapted to engage the side walls of the rubber tires substantially at the forward portions of said steering wheels for imparting steering movement to the wheels, clamping ribs formed in said bracket end portions adjacent to said slots, and washers on said axle members having cooperating clamping ribs adapted to have interlocking engagement with the clamping ribs on said bracket end portions.

10. In hitch apparatus for towing a tractor of the type having at its front end a centrally disposed steering column with two closely spaced steering wheels on opposite sides of said column, both of said wheels having steering movement about a single centrally disposed steering axis extending through said column, the combination of a draft beam, a front draft connection pivotally connecting the front end of said draft beam to a towing vehicle and accommodating laterally swinging movement of said beam relatively to said towing vehicle around a single front pivotal axis, a rear draft connection pivotally connecting the rear end of said draft beam to said steering column of the tractor and accommodating lateral swinging movement of said draft beam relatively to the tractor around a single rear pivotal axis, said single rear pivotal axis being substantially concentric with the steering axis extending through said steering column, and steering means for imparting lateral movement to the steering wheels of the tractor, said steering means being fixed in rigid relation to said draft beam with regard to all lateral steering movement of said draft beam, whereby said draft beam and said steering means both swing laterally together as a single rigid unit concentrically with respect to said single front pivotal axis and concentrically with respect to said single rear pivotal axis.

11. In a dirigible hitch connection for towing a vehicle of the type in which the front steering wheels are in closely spaced relation on opposite sides of a central steering column around which said wheels swing in their steering movement, the combination of a draft beam adapted to have draft connection at its front end with a towing vehicle and to have draft connection at its rear end with said steering column, said draft beam being capable of lateral swinging movement relatively to the towed vehicle around a single axis disposed between said wheels, steering means associated with said draft beam for imparting steering movement to said front steering wheels of the towed vehicle, and connecting means joining said steering means to said draft beam whereby said steering means can be adjusted relatively to said draft beam but wherein during the towing use of the hitch connection said steering means is held in laterally rigid relation with respect to said draft beam so that said draft beam and said steering means both swing laterally together as a rigid unit concentrically with respect to said single axis which is disposed between said steering wheels of the towed vehicle.

ARTHUR F. STRAUS.